(12) United States Patent
Teler et al.

(10) Patent No.: US 7,777,741 B2
(45) Date of Patent: Aug. 17, 2010

(54) TECHNIQUES FOR ACCURATELY DETERMINING VISIBILITY OF OBJECTS FROM MULTIPLE VIEWPOINTS IN A THREE-DIMENSIONAL (3D) ENVIRONMENT

(75) Inventors: Eyal Teler, Jerusalem (IL); Axelrod Ramon, Holon (IL)

(73) Assignee: AiSeek Ltd., Ramat-Gan (IL)

( * ) Notice: Subject to any disclaimer, the term of this patent is extended or adjusted under 35 U.S.C. 154(b) by 922 days.

(21) Appl. No.: 11/367,301

(22) Filed: Mar. 6, 2006

(65) Prior Publication Data
US 2006/0221073 A1 Oct. 5, 2006

Related U.S. Application Data

(60) Provisional application No. 60/658,170, filed on Mar. 4, 2005.

(51) Int. Cl.
*G06T 15/40* (2006.01)
*G06T 15/50* (2006.01)
*G06T 15/60* (2006.01)

(52) U.S. Cl. .................. 345/421; 345/422; 345/426

(58) Field of Classification Search .......... 345/426, 345/422
See application file for complete search history.

(56) References Cited

U.S. PATENT DOCUMENTS

| | | | | |
|---|---|---|---|---|
| 5,986,669 | A * | 11/1999 | Kirkland | 345/620 |
| 6,501,468 | B1 * | 12/2002 | Kaji | 345/419 |
| 6,525,726 | B1 * | 2/2003 | Xie et al. | 345/421 |
| 7,292,239 | B1 * | 11/2007 | Moreton et al. | 345/419 |
| 7,400,325 | B1 * | 7/2008 | Gimby et al. | 345/421 |
| 2005/0231504 | A1 * | 10/2005 | Heng et al. | 345/420 |
| 2006/0176303 | A1 * | 8/2006 | Fairclough | 345/426 |

* cited by examiner

*Primary Examiner*—Kee M Tung
*Assistant Examiner*—Jacinta Crawford
(74) *Attorney, Agent, or Firm*—Sughrue Mion, PLLC (57) ABSTRACT

An apparatus for determining visibility of agents in a scene from multiple viewpoints in a there-dimensional environment. The apparatus comprises a programmable vertex processor operable to execute a plurality of vertex programs. A programmable fragment processor is provided that is operable to execute a plurality of pixel shaders programs, said vertex programs and said pixel shaders programs operable to render each object in the scene multiple times from multiple viewpoints. A processing unit is provided that is operable to analyze the rendered viewpoints to determine visibility area of the agents.

44 Claims, 8 Drawing Sheets

TECHNIQUES FOR ACCURATELY DETERMINING VISIBILITY OF OBJECTS FROM MULTIPLE VIEWPOINTS IN A THREE-DIMENSIONAL (3D) ENVIRONMENT

CROSS-REFERENCE TO RELATED APPLICATION

This application claims the benefit of U.S. Provisional Patent Application No. 60/658,170 filed on Mar. 4, 2005.

TECHNICAL FIELD

This disclosure teaches techniques that generally relate to computer and video games, and more particularly to the determination of the visibility of objects from multiple view points in a there-dimensional (3D) environment.

BACKGROUND

References

The following U.S. patents and papers provide useful background information, for which they are incorporated herein by reference in their entirety.

Patents

U.S. Pat. No. 6,961,055 November 2005 Doak, et al.
U.S. Pat. No. 6,816,161 November 2004 Lavelle, et al.
U.S. Pat. No. 6,424,351 Jul. 23, 2002 Bishop, et al.

Other References

1. "The GeForce 6 Series GPU Architecture" by Emmett Kilgariff and Randima Fernando
2. "Mapping Computational Concepts to GPUs" by Mark Harris One of the requirements of artificial intelligence (AI) modules that are utilized in computer games and military simulation is to provide agents (i.e., game entities) with capabilities to accurately determine the visibility and detection information of objects in a 3D environment. Agents are objects that take active part in the game. For example, in a football electronic game agents may be the teams' players, coaches, and referees. Better visibility and detection emulation creates more natural looking agents.

In the related art, most computer games use ray casting methodologies to determine visibility. Specifically, for every viewpoint of an agent few rays are cast towards the direction that the agent looks at, i.e., from the agent to others object in the 3D environment. All objects along the rays (i.e., agent and non-agent objects) are checked to determine which of the objects the rays intersects first. Objects beyond the first intersected object are considered to be hidden. To reduce the computation power required for processing, objects are usually represented as points or by boxes having a size essentially similar to that of the object size. In addition, the distance from an agent to the intersected objects is determined. Objects that are above a predefined distance are considered to be non-visible.

Drawbacks of related techniques used to determine the visibility are that such techniques do not take into account objects being partially covered. Further, they do not provide information for computing detection. Namely, related art only provides for line of sight detection. Moreover, the related art does not provide ways to compare between visibilities of different objects and determine "what catches the eye". Specifically, there is no way to take into account degradation of visibility away from the center of vision, objects coloration against background coloration (i.e., objects with the same color as the background are hard to see), speed of objects (i.e., faster objects are more easily detected and slower objects are harder to see, and other visibility criteria are not taken into account except for specific predefined objects.

It would be therefore advantageous to provide a solution that accurately and rapidly determines the visibility of agents.

SUMMARY

To realize some of the advantages discussed above there is provided an apparatus for determining visibility of agents in a scene from multiple viewpoints in a there-dimensional environment. The apparatus comprises a programmable vertex processor operable to execute a plurality of vertex programs. A programmable fragment processor is provided that is operable to execute a plurality of pixel shaders programs, said vertex programs and said pixel shaders programs operable to render each object in the scene multiple times from multiple viewpoints. A processing unit is provided that is operable to analyze the rendered viewpoints to determine visibility area of the agents.

In a specific enhancement, said plurality of vertex programs is capable of performing visual corrections.

In a specific enhancement the visual corrections include at least one of standard 3D transformations, field of view corrections, and translation of the rendered coordinates on a render frame to an appropriate view cell.

In another specific enhancement, the vertex processor processes a vertex data buffer and an orientation matrix for each object.

More specifically, the vertex processor processes a buffer of all viewpoints.

In another specific enhancement rendering said multiple viewpoints comprises generating an image that includes multiple viewpoints.

More specifically, said multiple viewpoints are arranged in a matrix.

More specifically, each of said multiple viewpoints consists of N×M pixels.

More specifically, said pixels are grouped into: agent object pixels and non-agent object pixels.

More specifically, each of said agent object pixel includes at least object identification (ID) number and color information.

More specifically, each of said non-agent object pixel includes at least one of a distance of the non-agent object from an agent object and color information.

In another specific enhancement, said visibility area of said agents is determined by counting the number of pixels having a same ID number.

In another specific enhancement said processing unit is further capable of determining detection coefficients of visible entities.

More specifically, said visible entities include agents and pre-designated objects.

More specifically, said detection coefficient corresponds to a probability of each visible entity to be detected in comparison with other visible entities.

In another specific enhancement, said visibility of objects is determined based on speed of said objects.

In another specific enhancement, visibility of objects is determined based on objects' colors and contrast to a background.

Another aspect of the disclosed teachings is a method for determining visibility of agents in a scene from multiple viewpoints in a three-dimensional (3D) environment comprising determining objects in the scene. A shader program is provided. Viewpoints for the agents are determined. Multiple viewpoints are rendered using said objects and said shader programs. Effective total visible area for each of said agents are determined. Detection coefficients for visible entities in said scene are determined.

Other aspect of the disclosed teachings include machine readable media containing instructions to implement the above techniques in a general or special purpose computer.

BRIEF DESCRIPTION OF THE DRAWINGS

The disclosed teachings will become more apparent by describing in detail examples and embodiments thereof with reference to the attached drawings in which.

DETAILED DESCRIPTION

Techniques for accurate and fast determination of visibility of simulation agents are disclosed. An exemplary apparatus embodying the disclosed techniques includes programmable three-dimensional (3D) graphical accelerators and a processing unit. The graphical accelerators render multiple viewpoints for each scene and the processing unit computes the visible area of each agent. The disclosed teachings further determine the visibility with respect to the speed of agents, as well as their color and camouflage. This allows determining the detection coefficients of visible entities in the scene.

Figure 1:
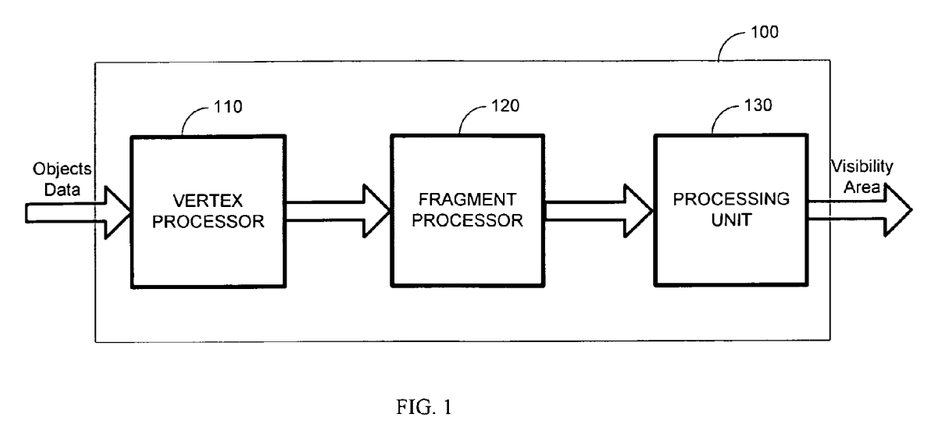
FIG. 1—is a block diagram of an apparatus for computing the visible area and detection coefficient of agents in accordance with an embodiment of the disclosed teachings FIG. 2—is a flowchart describing the method for accurately determining the visibility of agents in a 3D environment in accordance with an embodiment of the disclosed teachings FIGS. 3A through 3C—are pictorial representations of multi-viewpoints rendering by the disclosed teachings FIGS. 4A and 4B—are schematic representations of viewpoints matrix and pixels vectors generated by the disclosed teachings FIGS. 5A and 5B—are two schematic diagrams utilized to demonstrate the principles of the field of view corrections

FIG. 1 shows an exemplary and non-limiting block diagram of an apparatus 100 utilized for computing the visibility area of agents in accordance with an embodiment of the disclosed teachings. Apparatus 100 includes a programmable vertex processor 110 (or a "vertex shader"), a programmable fragment processor (or a "pixel shader") 120, and a processing unit 130. In accordance with the disclosed teachings, the vertex processor 110 and fragment processor 120 are programmable three-dimensional (3D) graphical accelerators utilized for non-graphics applications. In such configuration, the processors 110 and 120 operate as two programmable blocks that run serially. Specifically, vertex processor 110 and fragment processor 120 are programmed to allow rendering of multiple viewpoints of a scene.

Generally, vertex is a corner point of a triangle or other geometric image. In 3D computer graphics a vertex is a point in 3D space with a particular location, usually given in terms of its x, y, and z coordinates. It is one of the fundamental structures in polygonal modeling: two vertices, taken together, can be used to define the endpoints of a line; three vertices can be used to define a planar triangle. Attributes of vertices such as color, texture, position and direction are transformed from the original color space to the display space using a vertex shader program. In computer graphics "rendering" is the process of generating an image from a model, by means of a software program. The model is a description of three dimensional objects in a strictly defined language or data structure. It would contain geometry, viewpoint, texture and lighting information. A viewpoint is what an agent sees or might see in the scene. Examples for viewpoints are provided below with reference to FIG. 3.

Vertex processor 110 receives, for each object, the data of a vertex data buffer and the data of an orientation matrix. In addition, processor 110 receives a buffer of all viewpoints. The buffer of viewpoints includes the viewpoints of all agents in the scene. For each viewpoint, a program is applied on each vertex of an object to transform it to the viewpoint of view and for the purpose of performing visual corrections. The visual corrections will be described in greater detail below. The outcome of vertex processor 110 is vertices that are grouped into primitives, i.e., points, lines, or triangles in their appropriate position for each viewpoint. Fragment processor 120 operates to apply a pixel shader program to each fragment independently.

According to the disclosed teachings the visibility of agents is determined by using specialized vertex and pixel shader programs to render each object multiple times from multiple viewpoints. The rendered objects are used to create multiple viewpoints of a single scene in a single frame (or a view cell). The objects and viewpoints are not displayed on the screen, but are merely utilized for determining the visibility of agents. With this aim, vertex processor 110 receives the data of a vertex data buffer and the data of a buffer of all viewpoints. In order to determine the visibility, firstly, apparatus 100 renders an image that includes all viewpoints of agents in the scene (see FIG. 3b-c). The inputs are the buffer of all viewpoints, i.e., the viewpoints of all agents in the scene and a vertex data buffer that includes the vertices that form the objects in the scene. Details on how images are rendered normally are well known and are described, for example, in the cited references. For each viewpoint, a program is applied to each vertex of an object to perform visual corrections. The visual corrections occur after the standard 3D transformations and include, but are not limited to, field of view corrections, translation of the rendered coordinates on the render frame to the appropriate view cell, and the likes. The standard 3D transformations comprise sending the vertex to its appropriate position from a given viewpoint. This includes rotation and translation by multiplication of the position and a viewpoint projection matrix. Field of view corrections are performed to simulate normal field of view effects and will be described in greater detail below with reference to FIG. 5.

In one embodiment of the disclosed teachings processors 110 and 120 are coupled to a central processing unit (CPU). In this embodiment, the method CPU is programmed to sequentially trigger processors 110 and 120 to render all objects into each viewpoint at a time. The visual corrections are performed by vertex processor with the control of the CPU.

The vertices passed through vertex processor 110 contain information about the object identification (ID) and other information together with their standard color information. Fragment processor 120 outputs distorted colors data that compliant with processing unit 130. The shader program writes the object ID and other data (e.g., brightness and speed) into each pixel. Processing unit 130 analyzes the rendered viewpoints to determine the visibility area of each agent in the scene. Processing unit 130 further determines the detection coefficients of visible entities. These entities include agents and pre-designated objects that can be visible by other agents. A detection coefficient is a measure of the probability of a visible entity to be detected in comparison with other entities. The agents in the scene are ordered according to their detection coefficients.

Figure 2:
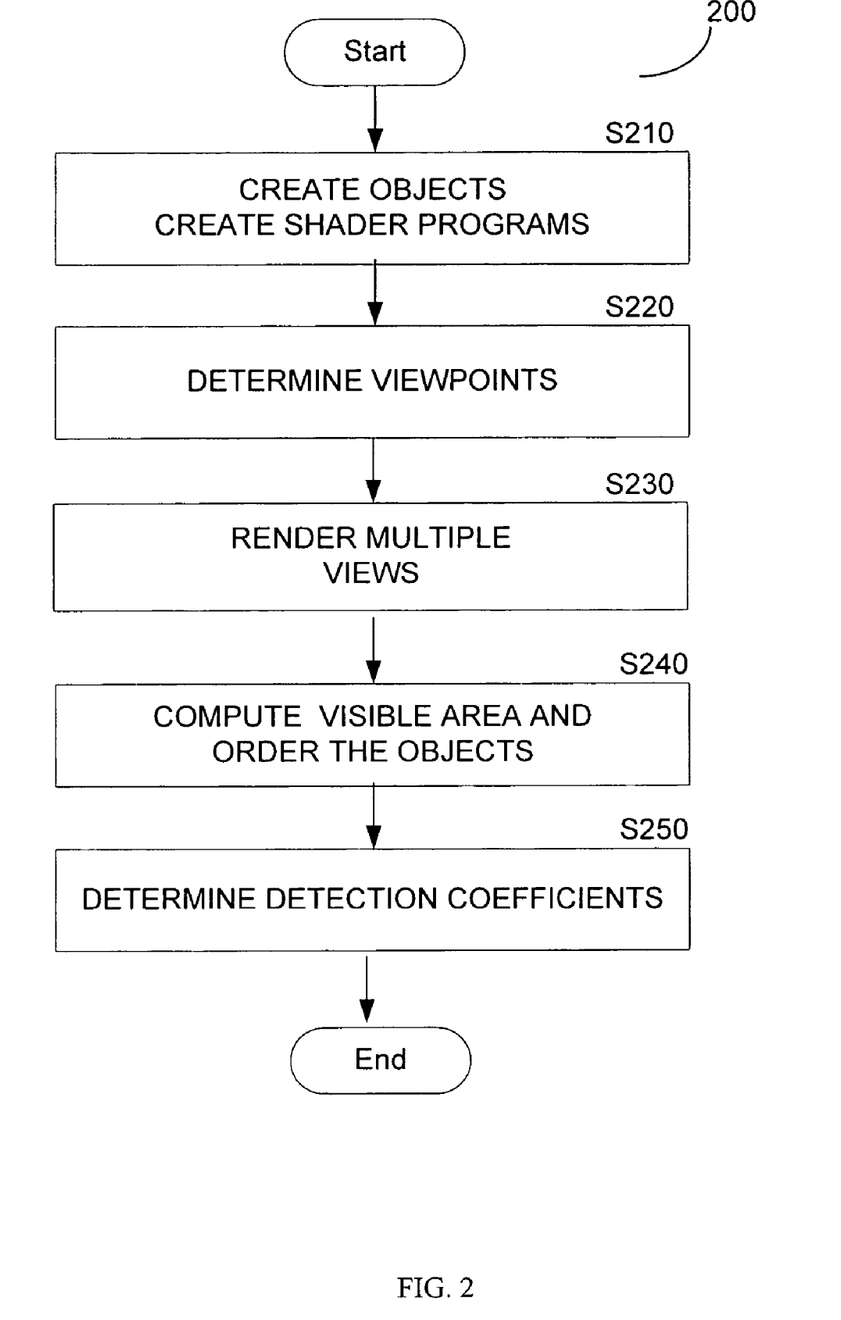

FIG. 2 shows an exemplary flowchart 200 describing the method for accurately determining the detection coefficient and visibility of objects in a 3D environment in accordance with one embodiment of the disclosed teachings. At S210 as initialization step, the scene's objects and shader programs for rendering different points of views in the scene are determined. This step includes creating a lower level of detail objects from the actual objects used by the graphics, assigning ID number for each object to be used by the vertex shader program, and building the shader program that performs visual corrections as described in greater detail above.

Figure 3A:
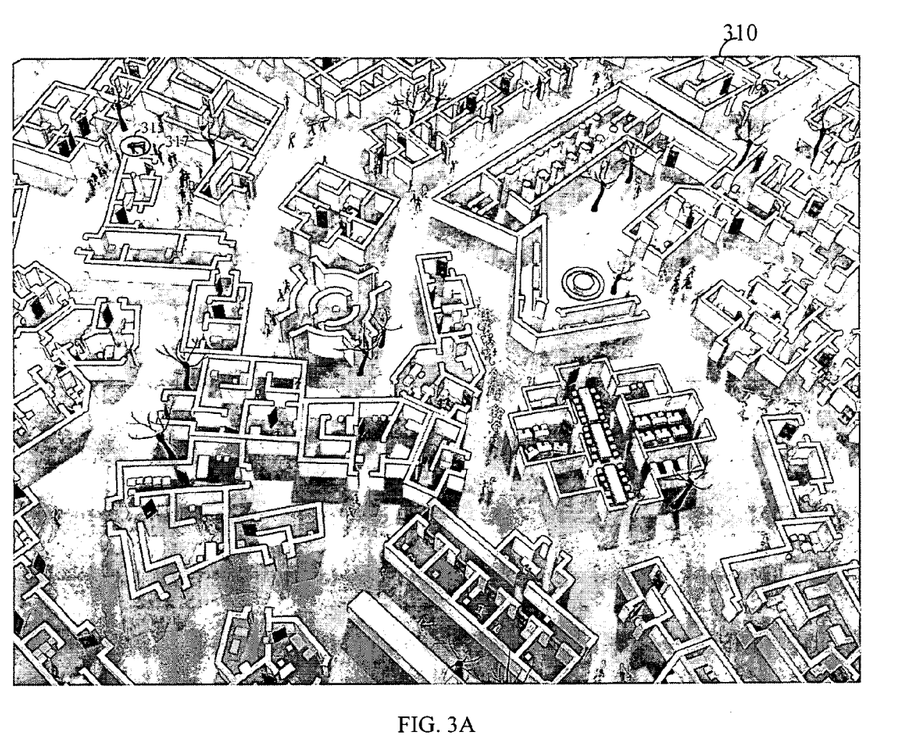

At S220, viewpoints are determined for all agents in the scene. In addition viewpoints may be defined by the user (e.g., a game developer). As a result, a buffer of all determined viewpoints is generated and objects vertex buffers are modified if needed. FIG. 3A shows an exemplary image 310 that represents a scene in a computer game. Image 310 includes agent and other non-agent objects that are part of the scene. For example, non-agent objects can be walls, cars, stands, and so on. As can be seen in area 315 of image 310, the agent objects are the people who carry a coffin and the non-agent object is the coffin. The vertex data and orientation matrix of agent and non-agent objects are provided as an input to vertex processor 110.

Figure 3B:
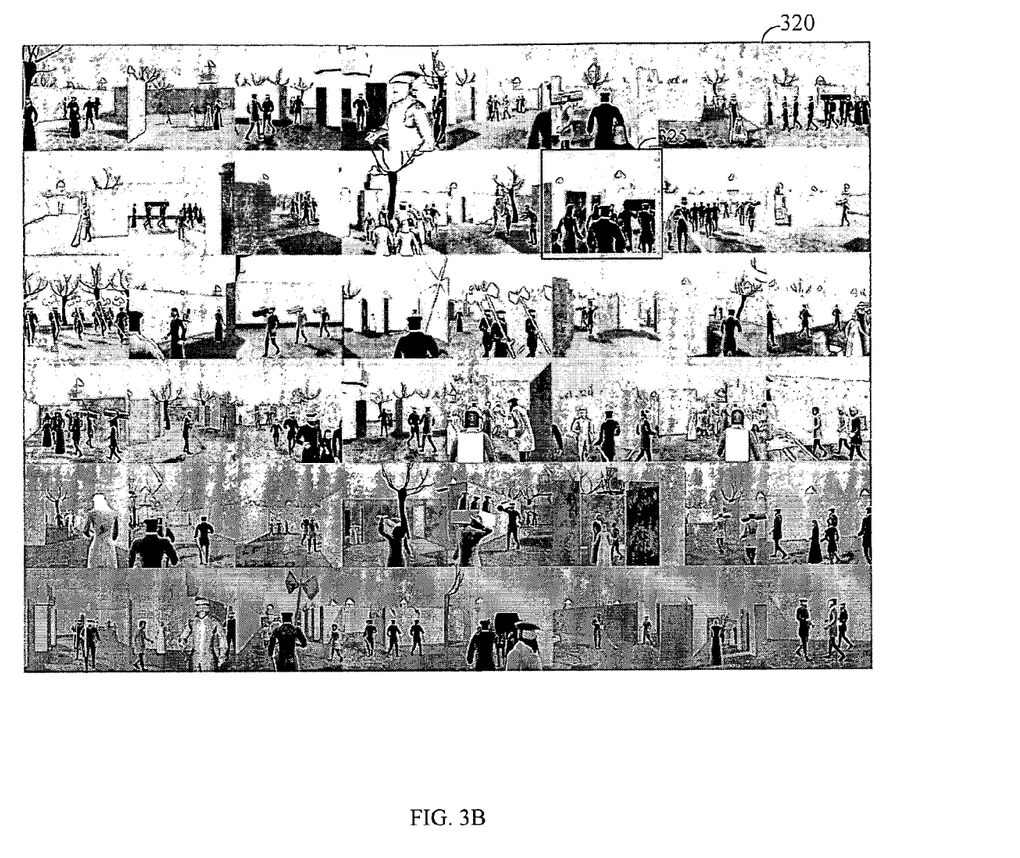
Figure 3C:
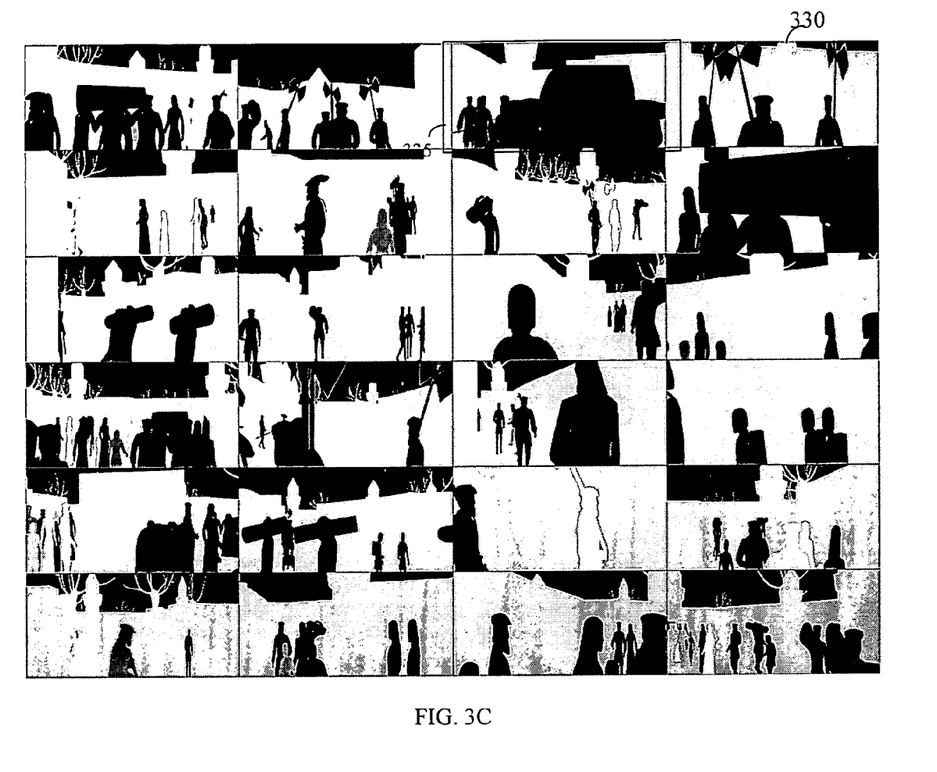
Figure 4A:
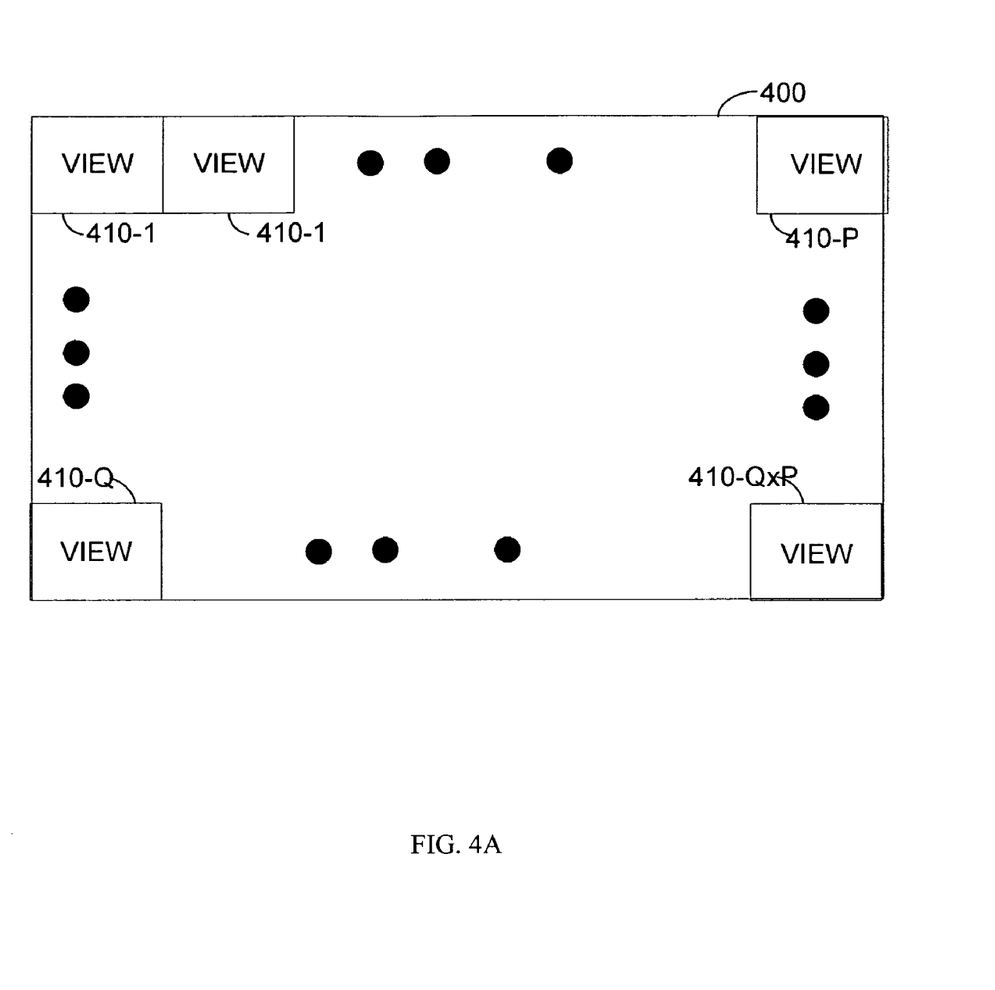
Figure 4B:
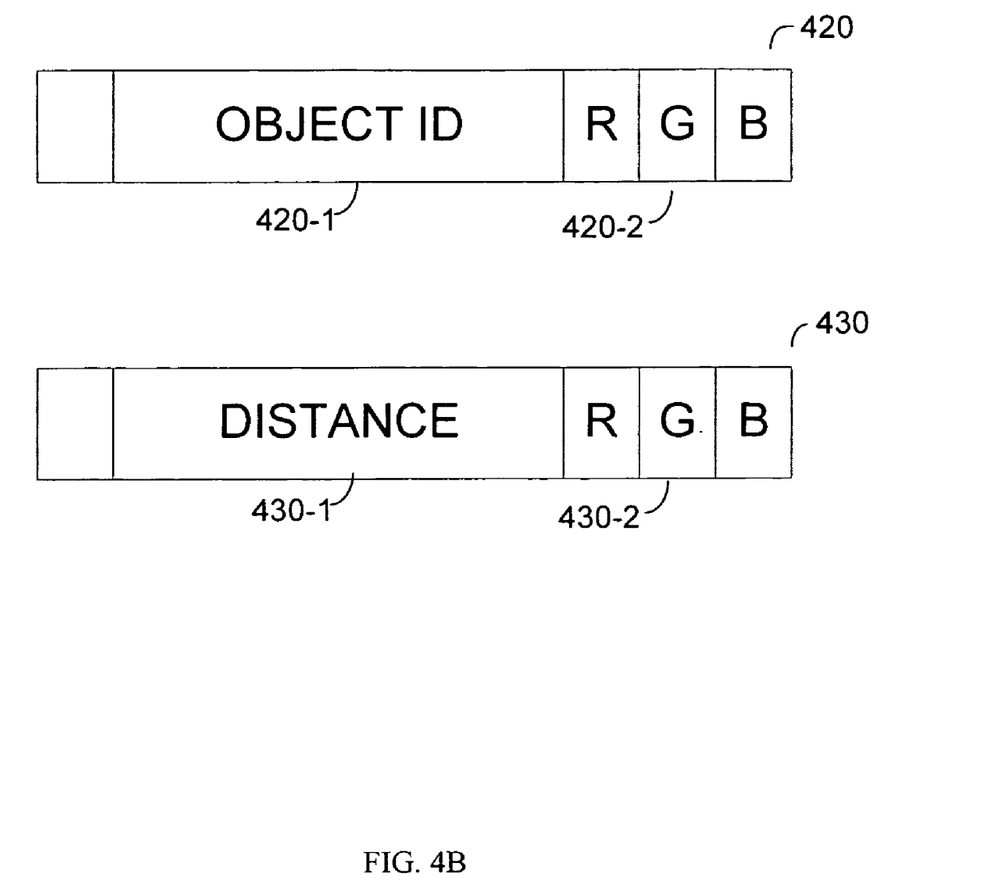

At S230, for the viewpoints determined at S220, multiple viewpoints are rendered. This is performed using the scene objects and shader programs provided at S210. The result of S230 is an image that includes multiple viewpoints maintained in a matrix. FIG. 4A is a schematic representation of matrix that includes P×Q viewpoints 410. Each viewpoint 410 consists of N×M pixels. There are two groups of pixels: a first group having pixels that belong to agent objects and a second group having pixels that belong to non-agent objects. Each pixel is represented using a vector that includes additional data besides the color. Specifically, as shown in FIG. 4B, a vector 420 belongs to a first group of pixels and maintains, in cell 420-1, an object ID and color information in cell 420-2. A vector 430 represents the second group of pixels and includes, in cell 430-1, the distance of the non-agent object from an agent object as well as the color information, in cell 430-2. FIG. 3B is an image 320 that contains viewpoints that were rendered for the scene shown in FIG. 3A. For example, viewpoint 325 is the point of view of the agent 317 (i.e., the agent who walks behind the coffin). Image 320 includes multiple viewpoints that were rendered normally, in terms of color and projections and without field of view transformations. However, the result of S230 is multiple viewpoints that their colors are replaced by object ID, and agents are projected in a way that reflect the visibility of each object. FIG. 3C shows an image 330 with multiple views rendered with ID for color and visibility correction. For example, viewpoint 335 is the view rendered for viewpoint 325. As can be seen such an image cannot provide any information if it were to be displayed to the viewer, but the image is compliant with processing unit 130.

At S240, the output image (e.g., image 330) having multiple rendered views is analyzed to determine, for each agent, its effective total visible area. Specifically, in each viewpoint (e.g., viewpoint 410) the number of pixels having the same object ID is counted, giving the total visible area for that object. Typically, the total visibility area, i.e., the area covered by an object from a reference location, stretches over many pixels. For complex vision models, the counting is performed by means of a complex counter that for each pixel adds a sum proportional to the information stored in the color field. Examples for this operation are provided below. At S250, the detection coefficients are determined for all visible entities in the scene. A detection coefficient corresponds to the probability of each entity to be detected in comparison to other visible entities. The detection coefficient of each visible entity may be function of its visible area, speed, color, and camouflage. Visible entities are then ordered according to their coefficients.

It should be appreciated by a person skilled in the art that the disclosed teachings accurately simulates the visual model of agents, and thus allows agents to precisely determine the visible area of objects while considering distance, partial cover, and camouflage. The disclosed teachings further allows the detection to be based on objects' speed, colors and contrast to the background, placement around a viewing agent, and so on. Specifically, performing speed based detection of objects comprises creating at S210 a vertex buffer for vertex processor 110 that includes velocity information. Next, processor 120 computes the actual speed of the non radial component and writes the speed to each pixel in the color field. Thereafter, processing unit 130, using the complex counter adds a sum to the pixel count that is proportional to the objects' velocity. High speed object are considered more visible. To perform detection based on colors and contrast to the background, at S210 the vertex buffer that includes color information created. Then, processor 120 is utilized to compute brightness against the background. This is done in two passes: a first past for the non-agent objects and second pass for the agent objects. Subsequently, processor 130 determines brighter objects are considered as more visible.

Figure 5A:
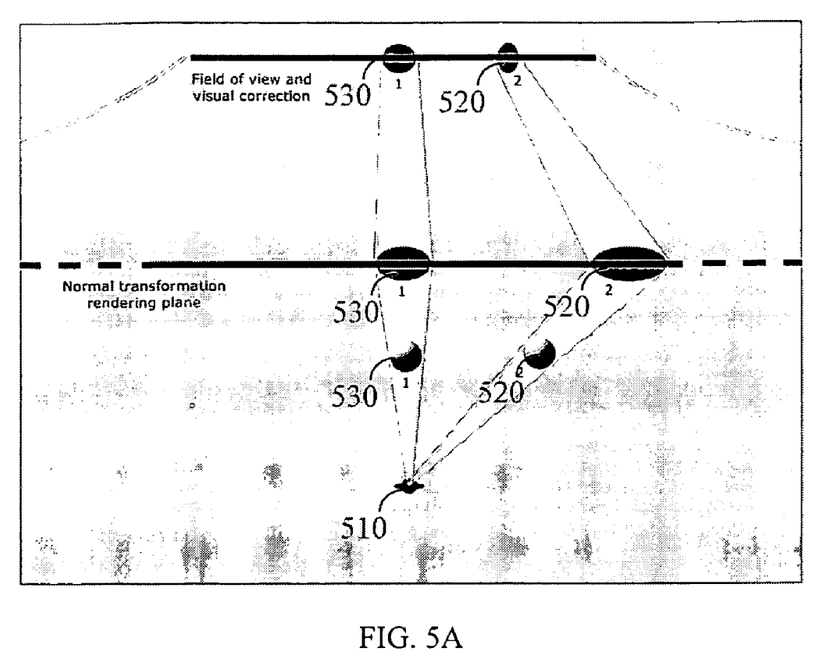
Figure 5B:
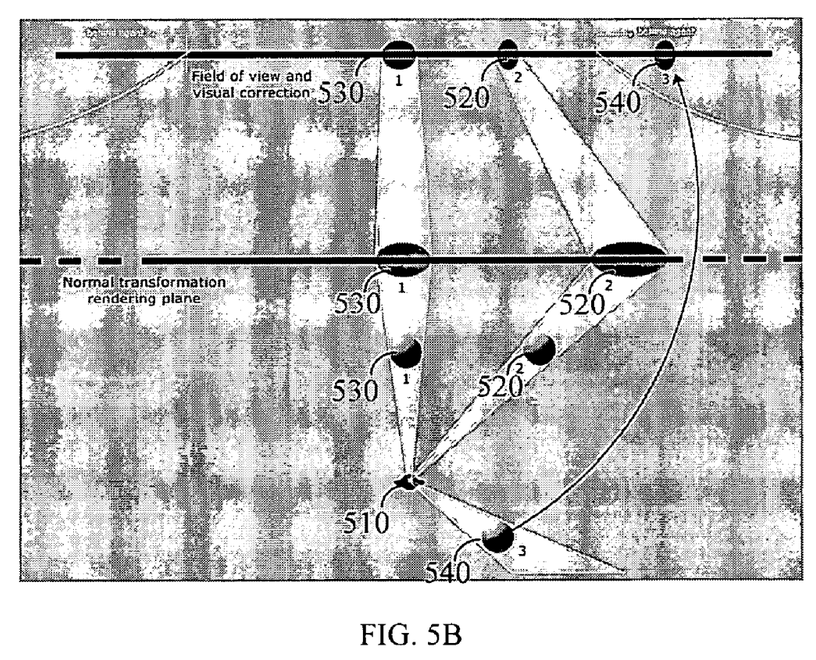

Referring to FIG. 5, two schematic diagrams utilized to demonstrate the principles of the field of view corrections are shown. As mentioned above field of view corrections are performed in order to simulate normal field of view effects. This is achieved by a contracting transformation of the x and y coordinates of a vertex from [−inf, inf] to a finite small segment of a predefined size. The transformation is non linear, i.e., most of the details are kept near the center and details for large angles are reduced. This is done to simulate a field of view of a more human-like eye, i.e., 180-degree facing forward field of view, with most accurate visual information in the center of the field of view, but with high sensitivity for movement in peripheral vision. The non linear transformation is utilized, since objects are normally rendered using a linear transformation. Therefore, the vertex ought to be correctly returned to its rendered frustum; otherwise, the object cannot be seen. As can be seen in FIG. 5B, an agent 510 looks at two balls 520 and 530. The normal transformation places ball 520 out of the center of the filed of view. The non linear transformation brings ball 520 back to its correct position. It should be noted that the simulation of field of view may be performed according to the type of the agent. As an example, for creatures (e.g., birds) having a complete 360-degree field of view other transformations may be used. An example for such transformation is provided in FIG. 5B, where an agent 510 looks at three balls 520, 530, and 540. Ball 540 is located behind agent 510, and thus is not displayed on the normal transformation plan. That is, ball 530 will rendered only of the field of view correction is applied.

Other aspect of the disclosed teachings is a computer program product including a machine-readable media comprising instructions. The instructions are capable of enabling a computer to implement the techniques described above. It should be noted that the machine-readable media could be any media from which a computer can receive instructions, including but not limited to hard disks, RAMs, ROMs, CDs, magnetic tape, internet downloads, carrier wave with signals, etc. Also instructions can be in any form including source code, object code, executable code, and in any language including higher level, assembly and machine languages. The computer system is not limited to any type of computer. It could be implemented in a stand-alone machine or implemented in a distributed fashion, including over the internet.

Other modifications and variations to the invention will be apparent to those skilled in the art from the foregoing disclosure and teachings. Thus, while only certain embodiments of the invention have been specifically described herein, it will be apparent that numerous modifications may be made thereto without departing from the spirit and scope of the invention.

What is claimed is:

1. An apparatus for determining visibility of agents in a scene from multiple viewpoints in a three-dimensional environment, said apparatus comprising:
   a programmable vertex processor operable to execute a plurality of vertex programs, each vertex program associated with an object and receives data from: a vertex data buffer, an orientation matrix and a buffer of all viewpoints;
   a programmable fragment processor operable to execute a plurality of pixel shaders programs, said vertex programs and said pixel shaders programs operable to render each object in the scene multiple times from multiple viewpoints; and
   a processing unit operable to the rendered viewpoints to determine visibility area of the agents;
   wherein said processing unit is further capable of determining detection coefficients of visible entities, wherein a detection coefficient is a measure of probability of a visible entity to be detected in comparison to other entities of the scene.

2. The apparatus of claim 1, wherein one of said plurality of vertex programs is capable of performing visual corrections.

3. The apparatus of claim 2, wherein said visual corrections include at least one of standard 3D transformations, field of view corrections, and translation of the rendered coordinates on a render frame to an appropriate view cell.

4. The apparatus of claim 1, wherein rendering the multiple viewpoints comprises generating an image that includes the multiple viewpoints for each object.

5. The apparatus of claim 4, wherein the multiple viewpoints are arranged in a matrix.

6. The apparatus of claim 5, wherein each of the multiple viewpoints consists of N×M pixels.

7. The apparatus of claim 6, wherein said pixels are grouped into: agent object pixels and non-agent object pixels.

8. The apparatus of claim 7, wherein each of said agent object pixel includes at least object identification (ID) number and color information.

9. The apparatus of claim 7, wherein each of said non-agent object pixel includes at least one of a distance of the non-agent object from an agent object and color information.

10. The apparatus of claim 1, wherein said visibility area of said agents is determined by counting the number of pixels having a same ID number.

11. The apparatus of claim 1, wherein said visible entities include agents and pre-designated objects.

12. The apparatus of claim 1, wherein said visibility of objects is determined based on speed of said objects such that an object having a higher speed is considered to be more visible.

13. The apparatus of claim 1, wherein visibility of objects is determined based on objects' colors and contrast to a background.

14. A method for determining visibility of agents in a scene from multiple viewpoints in a three-dimensional (3D) environment comprising:
   providing objects in the scene to a vertex processor;
   providing for each viewpoint of the multiple viewpoints a vertex shader program to said vertex processor and a pixel shader program to a fragment processor coupled to an output of said vertex processor;
   determining the multiple viewpoints for each of the agents;
   rendering the multiple viewpoints using said objects and said vertex shader program of said vertex processor and said pixel shader program of said fragment processor;
   determining effective total visible area for each of said agents by means of a processing unit coupled to said fragment processor; and
   determining detection coefficients for visible entities in said scene by said processing unit, wherein a detection coefficient is a measure of probability of a visible entity to be detected in comparison to other entities of the scene.

15. The method of claim 14, wherein providing said objects further comprises:
   creating a lower level of greater detailed objects; and
   assigning by said vertex processor an identification (ID) number for each object to be used by said vertex shader programs.

16. The method of claim 14, wherein said one of said vertex shader program is capable of performing at least visual corrections.

17. The method of claim 16, wherein said visual corrections include at least one of standard 3D transformations, field of view corrections, and translation of rendered coordinates on a render frame to an appropriate view cell.

18. The method of claim 14, wherein said viewpoints are user-defined.

19. The method of claim 14, wherein determining the multiple viewpoints further comprising:
   generating a buffer for each agent by said vertex processor for the multiple viewpoints of said each agent.

20. The method of claim 14, wherein rendering the multiple viewpoints further comprises:
   generating an image that includes the multiple viewpoints.

21. The method of claim 20, wherein the multiple viewpoints are arranged in a matrix.

22. The method of claim 21, wherein each of the multiple viewpoints consists of N×M pixels.

23. The method of claim 22, wherein said pixels are grouped into: agent object pixels and non-agent object pixels.

24. The method of claim 23, wherein each of said agent object pixel includes at least an object ID number and color information.

25. The method of claim 23, wherein each of said non-agent object pixel includes at least a distance of the non-agent object from an agent object and color information.

26. The method of claim 14, wherein determining said visibility area of said object further comprises:
   counting a number of pixels having the same ID number.

27. The method of claim 14, wherein said visible entities include at least agents and pre-designated objects.

28. The method of claim 14, wherein said visibility of objects is determined based on speed of said objects such that an object having a higher speed is considered to be more visible.

29. The method of claim 14, wherein said visibility of objects is determined based on objects' colors and contrast to a background.

30. A computer program product including non-transitory machine-readable tangible media comprising instructions to implement a method for determining visibility of agents in a scene from multiple viewpoints in a there-dimensional (3D) environment in a computer, the method comprises:
   determining objects in the scene;
   providing shader programs;
   determining viewpoints for the agents;
   rendering multiple viewpoints using said objects and said shader programs;
   determining effective total visible area for each of said agents; and
   determining detection coefficient for visible entities in said scene;
   wherein said visible entities include at least agents and pre-designated objects; and
   wherein said detection coefficient corresponds to a probability of each visible entity to be detected in comparison to other visible entities.

31. The computer program product of claim 30, wherein determining said objects further comprises:
   creating a lower level of greater detailed objects; and
   assigning an identification (ID) number for each object to be used by said vertex shader programs.

32. The computer program product of claim 31, wherein said one of said vertex program is capable of performing at least visual corrections.

33. The computer program product of claim 32, wherein said visual corrections include at least one of standard 3D transformations, field of view corrections, and translation of rendered coordinates on a render frame to an appropriate view cell.

34. The computer program product of claim 30, wherein said viewpoints are user-defined.

35. The computer program product of claim 30, wherein determining the multiple viewpoints further comprises:
   generating a buffer for each agent by said vertex processor for the multiple viewpoints of said each agent.

36. The computer program product of claim 30, wherein rendering the multiple viewpoints further comprising:
   generating an image that includes the multiple viewpoints.

37. The computer program product of claim 36, wherein the multiple viewpoints are arranged in a matrix.

38. The computer program product of claim 37, wherein each of the multiple viewpoints consists of N×M pixels.

39. The computer program product of claim 38, wherein said pixels are grouped into: agent object pixels and non-agent object pixels.

40. The computer program product of claim 39, wherein each of said agent object pixel includes at least an object ID number and color information.

41. The computer program product of claim 39, wherein each of said non-agent object pixel includes at least: a distance of the non-agent object from an agent object and color information.

42. The computer program product of claim 30, wherein determining said visibility area of said object further comprises:
   counting a number of pixels having the same ID number.

43. The computer program product of claim 30, wherein said visibility of objects is determined based on speed of said objects such that an object having a higher speed is considered to be more visible.

44. The computer program product of claim 30, wherein said visibility of objects is determined based on objects' colors and contrast to a background.

* * * * *